(12) United States Patent
Velderman et al.

(10) Patent No.: US 10,098,278 B2
(45) Date of Patent: Oct. 16, 2018

(54) MOWER

(71) Applicant: Black & Decker Inc., New Britain, CT (US)

(72) Inventors: Matthew J. Velderman, Baltimore, MD (US); Daniel J. White, Baltimore, MD (US); Ryan Peloquin, Ellicott City, MD (US); Andrew E. Seman, Jr., Pylesville, MD (US)

(73) Assignee: BLACK & DECKER INC., New Britain, CT (US)

( * ) Notice: Subject to any disclaimer, the term of this patent is extended or adjusted under 35 U.S.C. 154(b) by 49 days.

(21) Appl. No.: 15/049,979

(22) Filed: Feb. 22, 2016

(65) Prior Publication Data

US 2016/0242356 A1   Aug. 25, 2016

Related U.S. Application Data

(60) Provisional application No. 62/118,643, filed on Feb. 20, 2015.

(51) Int. Cl.

| | |
|---|---|
| *B60K 1/00* | (2006.01) |
| *A01D 34/64* | (2006.01) |
| *A01D 34/78* | (2006.01) |
| *A01D 75/00* | (2006.01) |
| *A01D 69/02* | (2006.01) |
| *B60P 3/12* | (2006.01) |

(52) U.S. Cl.
CPC ............. *A01D 34/64* (2013.01); *A01D 34/78* (2013.01); *A01D 69/025* (2013.01); *A01D 75/006* (2013.01); *B60P 3/122* (2013.01); *B60P 3/125* (2013.01)

(58) Field of Classification Search
CPC .. A01D 69/025; A01D 34/6806; A01D 34/01; A01D 34/64; A01D 34/78; A01D 35/006
See application file for complete search history.

(56) References Cited

U.S. PATENT DOCUMENTS

| 1,766,163 | A | 6/1930 | Vukosav |
|---|---|---|---|
| 2,038,001 | A | 4/1936 | Redding |
| 2,159,885 | A | 5/1939 | Cullin |

(Continued)

FOREIGN PATENT DOCUMENTS

| BE | 1002742 | 5/1991 |
|---|---|---|
| KR | 2012139456 | 12/2012 |

*Primary Examiner* — Hau V Phan
(74) *Attorney, Agent, or Firm* — Michael Aronoff (57) ABSTRACT

The present invention is directed to a lawn mower and more particularly to a system and method of charging a variety of batteries of the lawn mower including connecting the lawn mower to a towing vehicle, either directly or by placing the lawn mower on a trailer, towing the lawn mower, generating electricity upon towing the lawn mower utilizing a generator mechanically coupled to the lawn mower wheels or the wheels of the trailer. The generator converts the mechanical energy into electrical energy. The generator is electrically coupled to first type of battery and a second type of battery that is connected to the lawn mower and/or a first type of battery and a second type of battery that is connected to a charging station on the trailer. The system also includes a charging circuit for each of the first type of battery and the second type of battery.

10 Claims, 8 Drawing Sheets

(56) References Cited

U.S. PATENT DOCUMENTS

| | | | |
|---|---|---|---|
| 4,870,811 A * | 10/1989 | Steele | A01D 34/001 56/10.5 |
| 5,921,334 A | 7/1999 | Al-Dokhi et al. | |
| 6,456,040 B1 | 9/2002 | Hamilton et al. | |
| 6,675,562 B2 * | 1/2004 | Lawrence | A01D 34/6806 56/16.9 |
| 7,514,803 B2 | 4/2009 | Wilks et al. | |
| 7,547,980 B2 | 6/2009 | Harrison et al. | |
| 8,253,373 B2 | 8/2012 | Vercoulen et al. | |
| 8,347,999 B2 | 1/2013 | Koelsch et al. | |
| 8,733,072 B2 * | 5/2014 | Hansen | B60T 7/042 56/10.8 |
| 8,912,751 B2 | 12/2014 | Umemura et al. | |
| 2004/0135373 A1 * | 7/2004 | Osborne | A01D 34/6806 290/1 A |
| 2008/0216458 A1 * | 9/2008 | Lucas | A01D 69/025 56/10.6 |
| 2008/0289890 A1 | 11/2008 | Stoltzfus et al. | |
| 2011/0234150 A1 | 9/2011 | Furukawa et al. | |
| 2012/0104991 A1 | 5/2012 | Suzuki et al. | |
| 2012/0235626 A1 | 9/2012 | Oh et al. | |
| 2013/0111864 A1 * | 5/2013 | Hansen | B60T 7/042 56/10.8 |
| 2013/0111865 A1 * | 5/2013 | Hansen | F02N 11/0803 56/11.3 |
| 2013/0119932 A1 | 5/2013 | Moon et al. | |
| 2013/0169212 A1 | 7/2013 | Sun et al. | |
| 2013/0211648 A1 * | 8/2013 | Yamamura | G05D 1/021 701/22 |
| 2013/0317680 A1 * | 11/2013 | Yamamura | G05D 1/0265 701/22 |
| 2013/0335014 A1 * | 12/2013 | Ashinghurst | H02J 7/025 320/108 |
| 2014/0084843 A1 | 3/2014 | Pham et al. | |
| 2014/0091750 A1 | 4/2014 | Ikeda et al. | |
| 2014/0137528 A1 * | 5/2014 | Schygge | B60K 1/04 56/10.7 |
| 2014/0196425 A1 * | 7/2014 | Lewis | H02J 7/0068 56/16.7 |
| 2014/0239879 A1 | 8/2014 | Madsen et al. | |
| 2014/0252996 A1 * | 9/2014 | Lucas | A01D 69/025 318/139 |
| 2014/0272516 A1 * | 9/2014 | Tennison | H01M 2/105 429/120 |
| 2014/0299089 A1 * | 10/2014 | Koenen | F04B 17/05 123/179.28 |
| 2015/0014991 A1 | 1/2015 | Al | |
| 2015/0107210 A1 * | 4/2015 | Zerbarini | A01D 34/52 56/12.9 |
| 2015/0366130 A1 * | 12/2015 | Bergstrom | G05D 1/0259 701/23 |
| 2015/0366137 A1 * | 12/2015 | Markusson | G05D 1/03 320/107 |
| 2016/0007525 A1 * | 1/2016 | Drew | A01D 34/006 56/10.2 R |

\* cited by examiner

MOWER

CROSS REFERENCE TO RELATED APPLICATIONS

This application claims priority to U.S. Provisional Application 62/118,643 filed on Feb. 20, 2015. The disclosure of the above application is incorporated herein by reference.

FIELD OF THE INVENTION

This invention relates generally to power tool cordless systems.

BACKGROUND

Lawn mowers used by landscaping providers are typically moved from location to location by placing the mower on a trailer and pulling the trailer by a driven vehicle, such as a pickup truck. Furthermore, mowers are typically powered by internal combustion engines to drive the mower wheels and the cutting blades. These mowers may also include an internal battery for powering electrical elements of the mower. Alternate mowers may include an electric motor and a battery for powering the electric motor wherein the electric motor drives the mower wheels and the cutting blades.

Additionally, landscaping providers utilize cordless, battery operated power tool to provide various services including, for example, such tools as string trimmers, blowers, and drills.

It would be desirable to provide a system and method for charging the mower batteries and/or the cordless power tool batteries during transportation of the mower from location to location.

SUMMARY

In one general aspect, the present invention may include a lawn mower, comprising at least two wheels for driving the mower; at least one blade for cutting grass; a generator for generating electricity; an electric motor electrically coupled to the generator for receiving the generated electricity, the electric motor coupled to the at least two wheels for driving the at least two wheels and/or the at least one blade for driving the at least one blade; a charging circuit electrically coupled to the generator for receiving the generated electricity; and at least one receptacle for receiving a removable battery pack, the receptacle including an electrical interface for electrically coupling the receptacle to the charging circuit to provide a charging current from the charging circuit to the receptacle and a mechanical interface for receiving and physically coupling the battery pack to the receptacle, wherein the electrical interface and the mechanical interface are substantially similar to an electrical interface and a mechanical interface of a cordless power tool such that the battery pack may electrically and mechanically couple to the mower electrical and mechanical interfaces to receive a charging current from the charging circuit and to the power tool electrical and mechanical interface to provide a discharging current to the power tool to operate the power tool.

In another aspect, the present invention may include a lawn mower comprising at least two wheels for driving the mower; at least one blade for cutting grass; a generator mechanically coupled to at least one of the at least two wheels, wherein the generator converts mechanical energy generated by the at least one of the at least two wheels into electrical energy as the at least two wheels rotate when the mower is being pulled on a road; a first charging circuit electrically coupled (a) to the generator for receiving electricity and (b) to the first battery for providing a charging current to the first battery; a second battery; and a second charging circuit electrically coupled (a) to the generator for receiving electricity and (b) to the second battery for providing a charging current to the second battery.

In another aspect, the present invention may include a trailer for transporting a lawn mower, comprising a platform for supporting the mower; at least two wheels for supporting the platform on a road; a generator mechanically coupled to at least one of the at least two wheels, wherein the generator converts mechanical energy generated by the at least one of the at least two wheels into electrical energy as the at least two wheels rotate when the trailer is being pulled on the road; an electrical cable coupled at a first end to the generator for providing electricity; and a coupler connected to a second end of the electrical cable for electrically coupling to a mating coupler of the mower for providing electricity to the mower.

In another aspect, the present invention may include a lawn mower, comprising at least two wheels for driving the mower; at least one blade for cutting grass; an electric motor electrically coupled to the at least two wheels for driving the at least two wheels and/or the at least one blade for driving the at least one blade when the motor is turning in a first direction and for generating electricity when the motor is turning in a second direction opposite the first direction; a charging circuit electrically coupled to the electric motor for receiving the generated electricity; at least one receptacle for receiving a removable battery pack, the receptacle including an electrical interface for electrically coupling the receptacle to the charging circuit to provide a charging current from the charging circuit to the receptacle and a mechanical interface for receiving and physically coupling the battery pack to the receptacle, wherein the electrical interface and the mechanical interface are substantially similar to an electrical interface and a mechanical interface of a cordless power tool such that the battery pack may electrically and mechanically couple to the mower electrical and mechanical interfaces to receive a charging current from the charging circuit and to the power tool electrical and mechanical interface to provide a discharging current to the power tool to operate the power tool.

BRIEF DESCRIPTION OF THE DRAWINGS

The accompanying drawings illustrate preferred embodiments of the invention according to the practical application of the principles thereof, and in which:

FIGS. 10-11 illustrate a fifth exemplary embodiment of a mower and a charging system for charging batteries of the cordless system of FIGS. 1-2 where FIG. 10 shows the mower in a first position and FIG. 11 shows the mower in a second position.

DETAILED DESCRIPTION

Figure 1:
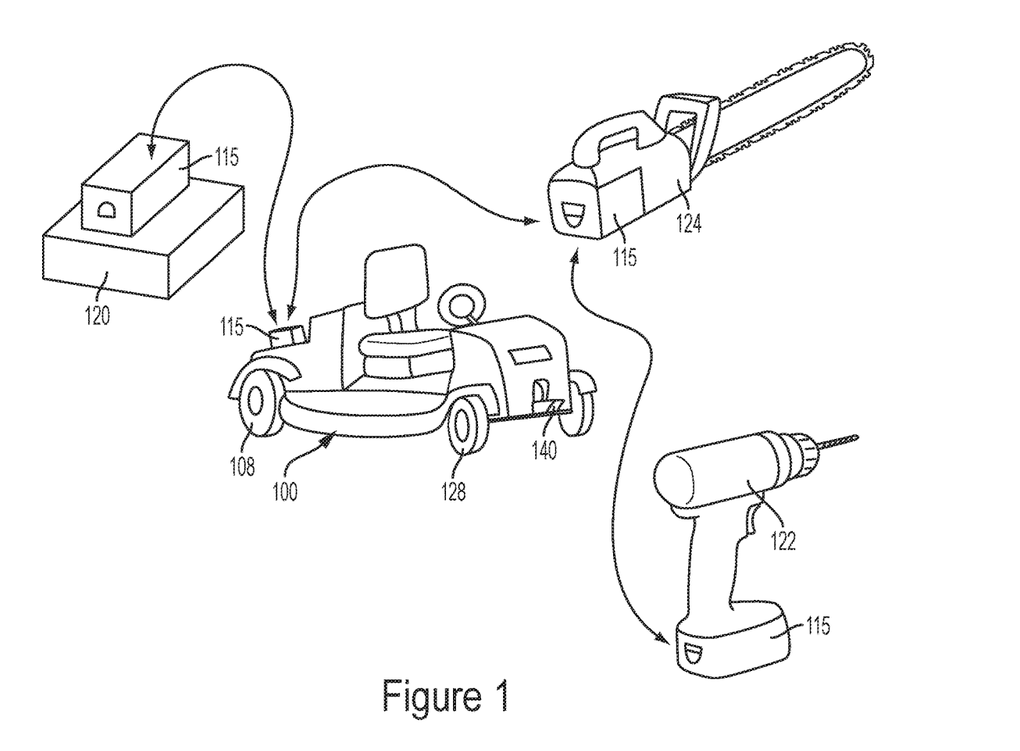
FIG. 1 illustrates a cordless system according to a first aspect of the invention.
Figure 2:
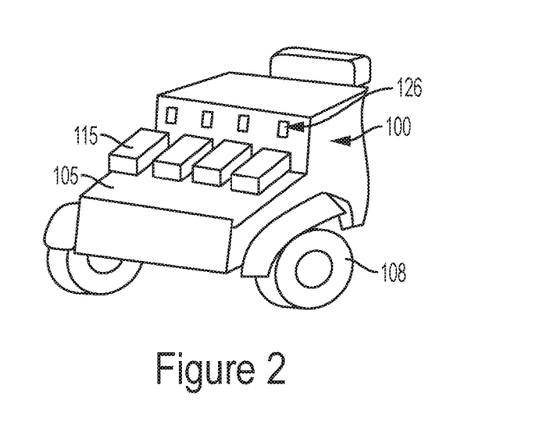
FIG. 2 is a partial rear view of a mower of the cordless system of FIG. 1.

The invention is now described with reference to the accompanying figures, wherein like numerals designate like parts. FIGS. 1-2 show a mower 100, which is preferably a riding mower. The mower 100 can be an electric mower which is driven by an electric motor, a gas mower which is driven by a gas engine, or a hybrid mower which has both an electric motor and a gas engine.

Figure 3:
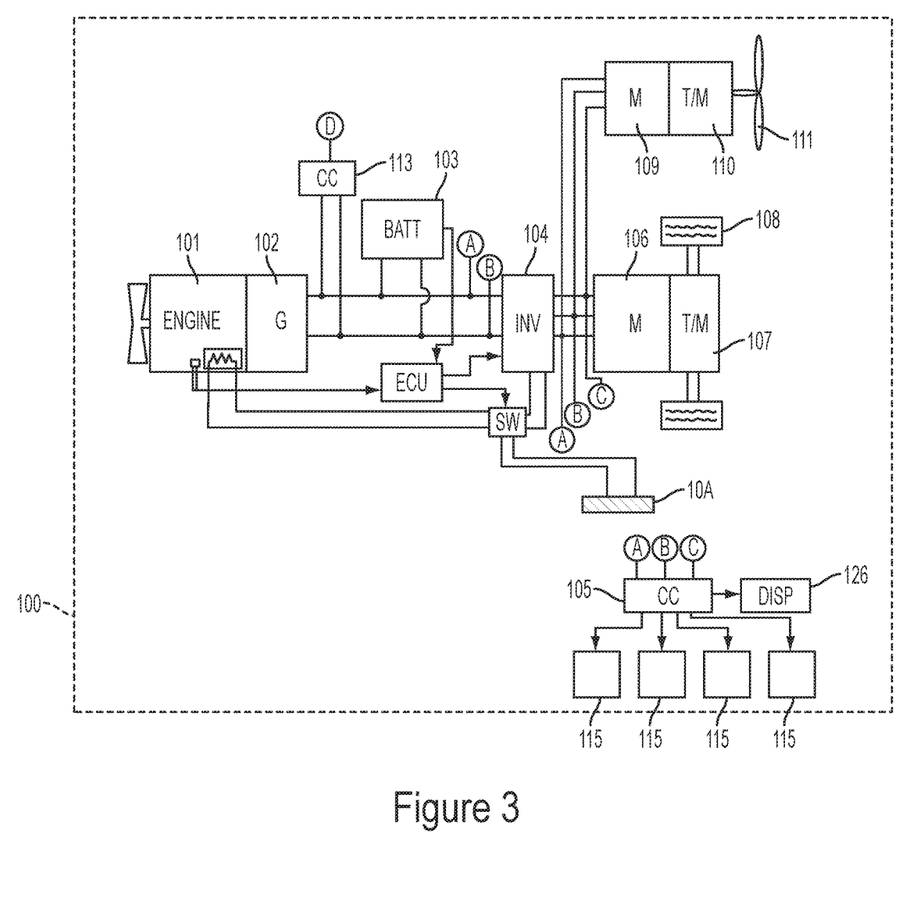
FIG. 3 is a block diagram showing an exemplary drive apparatus for the mower of FIGS. 1-2.

One drive apparatus for such a hybrid mower 100 is described in U.S. Pat. No. 5,323,868, which is hereby incorporated by reference. Such a drive apparatus is shown in FIG. 3. The hybrid mower 100 may have a gas engine 101 to be driven by fuel such as gasoline, a generator 102 driven by the engine 101 for generating DC electricity, a battery 103 for accumulating and storing the electricity generated by the generator 102, an inverter/rectifier 104 for converting DC electricity from the generator 102 and the battery 103 into AC electricity, an induction motor 106 to be driven by the AC electricity, and a transmission or gearbox 107 for transmitting the driving force of the motor 106 to a set of tires 108.

With such a drive apparatus, fuel such as gasoline is supplied to the engine 101 for rotation (at a predetermined RPM). The torque of the engine 101 is preferably transmitted to the generator 102 for conversion into DC electricity. Of the thus generated electricity, an amount sufficient to drive the motor 106 is preferably sent to the motor 106 via the inverter 104. The surplus DC electricity is preferably accumulated in the battery 103 which is capable of accepting relatively high charging currents and being charged at high charging rates.

The torque of the motor 106 is transmitted to the tires 108 via the transmission 107 to cause the hybrid mower 100 to travel. When the electricity sent to the motor 106 from the generator 102 is not enough to drive the motor 106, the battery 103 provides supplemental power to the inverter 104 and thus to the motor 106. The supply of electricity to the motor 106 is varied by controlling a built-in switching device of the inverter 104 to react accordingly to the extent of stepping on the accelerator or gas pedal.

To lower the speed of the hybrid mower 100, regenerative braking is used as a counterpart to engine braking. Regenerative braking is performed as the switching device built into the inverter 104 is controlled. During this regeneration, rotational energy is given to the motor 106 from the tires 108 via the transmission 107. Regenerated electricity is produced from the motor 106. The regenerated electricity is converted into DC electricity by the inverter 104, and is then accumulated in the battery 103.

Persons skilled in the art will recognize that, if DC motors are used instead of the induction motor 106, the entire electrical system of the hybrid mower 100 could be DC-based and thus obviating the need for inverter 104.

A second electric induction motor 109 is preferably connected to inverter 104. The torque of the motor 109 is transmitted to a set of cutting blades 111 via a transmission 110 to cause the hybrid mower 100 to cut grass or vegetation.

Also connected to the inverter 104 is a low charging rate charging circuit 105, which can provide charging current to charge one or more power tool battery packs 115, which are capable of accepting relatively low charging currents and being charged at relatively low charging rates. It should be understood that the terms "low" and "high" are simply intended to be relative terms. As such, a low charging rate charging circuit simply provides a charging current and a charging rate less than a high charging rate charging circuit and a high charging rate charging circuit provides a charging current and a charging rate greater than a low charging rate charging circuit. Such power tool battery packs 115 are described in US Patent Publication No. 2014/0272516, filed on Mar. 15, 2013, and U.S. Patent Application No. 62/000,112, filed May 18, 2014, which are hereby fully incorporated by reference. The power tool battery packs 115 can be connected to (1) a separate charger 120 for charging, (2) a power tool, such as drill 122, and/or (3) an outdoor power tool, such as a hedge trimmer or chain saw 124, for cutting vegetation, as shown in FIG. 1. The charging circuit 105 may also control as display 126, as shown in FIGS. 2-3, in order to indicate to the user which of the power tool battery packs 115 have been fully charged and/or the state of charge of the power tool battery packs 115.

Persons skilled in the art will recognize that the high charging rate charging circuit may provide high charging currents and current rates to the battery 103 resulting in relatively high power transfers (at least 500 watts and preferably at 3.5 kilowatts) to the battery 103. Depending on the characteristics of the battery 103, the battery 103 could be provided with power transfers on the order of about 10 kilowatts and preferably 25 kilowatts. However the low charging rate charging circuit 105 may only provide power transfers below 500 watts, even if the nominal voltage of the power tool battery pack 115 (between about 14 volts and about 60 volts) is different than the nominal voltage of the battery 103 (between around about 12 volts and about 48 volts).

Persons skilled in the art will recognize that the type of charging circuit 105 that is connected to inverter 104 is one that can preferably convert AC power into DC charging currents. However, charging circuit 105 can be connected to battery 103, in which case the charging circuit 105 can control the amount of DC charging current sent to the different battery packs 115. The charging circuit 105 may charge the power tool battery packs 115 according to the algorithms and sequences taught in US Patent Publication No. 2013/0335014, filed on Feb. 18, 2013, which is hereby fully incorporated by reference.

Persons skilled in the art will recognize that, in an electric mower 100, the charging circuit 105 could similarly be connected to an on-board mower battery or an inverter connected to the mower battery 103. Similarly, in a gas mower 100, the charging circuit 105 could similarly be connected to an on-board mower battery 103 or to an inverter/rectifier 104 connected to the mower battery 103 or to a generator 102 driven by the mower's gas engine 101.

Persons skilled in the art will recognize that providing a low charging rate charger circuit 105 will facilitate access to the charged power tool battery packs 115, as the user would not have to walk over to a charger 120. Instead a person driving the mower 100 can just drive the mower 100 to a location where the charged power tool battery packs 115 are needed.

It may be advantageous to maximize charging time for the power tool battery packs 115 and/or the battery 103. Accordingly, FIGS. 4-10 illustrate different systems that may implement various methods for charging such batteries during transportation of the mower 100.

Figure 4:
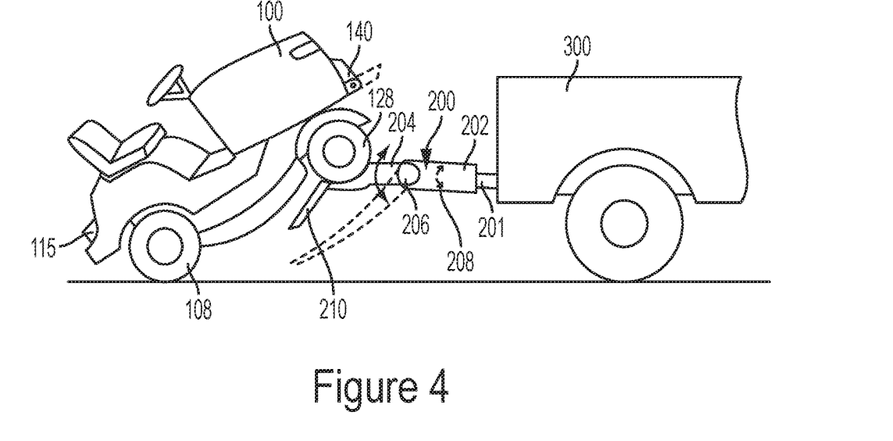
FIG. 4 illustrates a first exemplary embodiment of a mower and a charging system for charging batteries of the cordless system of FIGS. 1-2.

Referring to FIG. 4, a first exemplary embodiment of a mower and a charging system for charging batteries of the cordless system is illustrated. Therein, a trailer 200 is attached to a vehicle 300. The trailer 200 may carry the front wheels 128 of the mower 100, allowing the rear wheels 108 to rotate as the vehicle 300 travels to the next destination. As the wheels 108 rotate, rotational energy is provided to the motor 106 from the wheels 108 via the transmission 107. Regenerated electricity is produced from the motor 106. This regenerated electricity is converted into DC electricity by the rectifier 104, and is then accumulated in the battery 103. The regenerated electricity can also be used to power the charging circuit 105 and thus charge the power tool battery packs 115.

Preferably the trailer 200 is a powered trailer electrically connected to the battery of the vehicle 300. The trailer 200 may have a front fixed portion 202 attached to a towing hitch 201 of the vehicle 300, and a rear movable portion 204 pivotally attached to the front fixed portion 202. A motor 206 may cause the rear movable portion 204 to pivot relative to the front fixed portion 202. A user may control the rotation of the rear movable portion 204 via control buttons 208. The rear movable portion 204 may have a flap 210 pivotally attached thereto, in order to facilitate loading the mower 100 onto the trailer 200.

Figure 5:
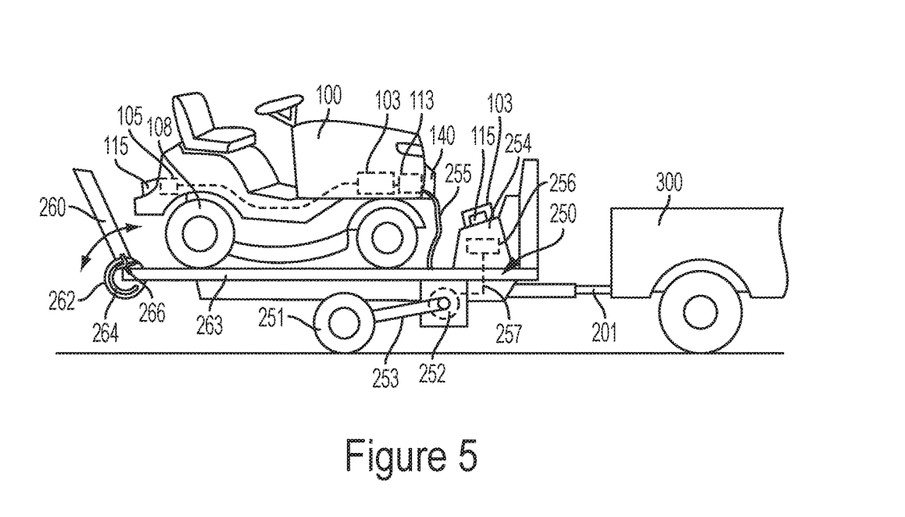
FIG. 5 illustrates a second exemplary embodiment of a mower and a charging system for charging batteries of the cordless system of FIGS. 1-2.
Figure 6:
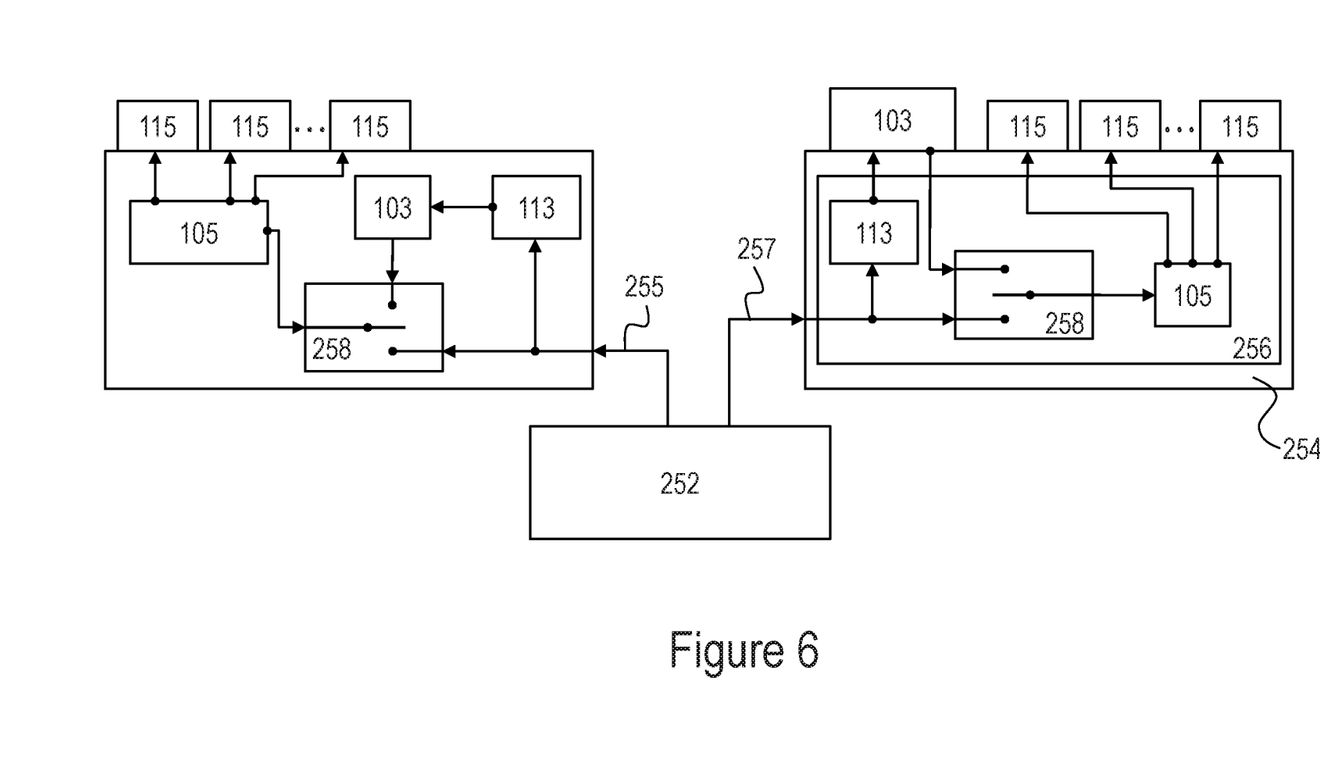
FIG. 6 is a block diagram of an exemplary charging system including a charging station of FIG. 5.

Referring to FIGS. 5-6, a second exemplary embodiment of a mower and a charging system for charging batteries of the cordless system is illustrated. Therein, a trailer 250 is attached to the vehicle 300 via a standard towing hitch 201. The trailer 250 has a set of wheels 251 connected to a generator or an alternator 252 via a belt or chain 253. Accordingly, as the trailer 250 is pulled by the vehicle 300, at least one of the wheels 251 and the generator/alternator 252 generate electricity.

The mower 100 may be connected to the generator/alternator 252 via a cable 255. The generated electricity can be used to charge the power tool battery packs 115 and/or the battery 103. As shown in FIG. 5, the cable 255 may be connected to the mower 100 at a point D (see FIG. 3), which in turn is connected to a high charging rate charging circuit 113 for charging the battery 103. Persons skilled in the art will recognize that the charging circuit 1113 may be disposed within the mower 100, or outside of the mower 100. For example, the charging circuit 113 could be integrated with the cable 255 or the generator/alternator 252.

The trailer 250 may have a charging station 254 with a charging circuit 256 connected to the generator/alternator 252 via an electrical connection 257. The generator/alternator 252 generates high currents and is capable of providing power for the high charging rate charging circuits. The charging circuit 256 receives the high current electricity generated by the generator/alternator 252 and provides charging currents to the power tool battery packs 115 via the charging circuit 105.

The charging station 254 may also charge a supplemental battery 103 that is separate from the mower 100. In this manner, if the battery 103 in the mower 100 is discharged beyond the allowed parameters, the user can quickly swap the discharged battery 103 with a charged battery 103. Referring to FIG. 6, the generator/alternator 252 can power a high charging rate charging circuit 113 for charging the supplemental battery 103. The generator/alternator 252 may also power a low charging rate charging circuit 105 for charging the power tool battery packs 115. The charging circuit 105 may also be powered by the supplemental battery 103. A relay switch 258 can be used to select the power source for the charging circuit 105, where the relay switch 258 selects the supplemental battery 103 as the power source when the supplemental battery 103 is connected to the charging circuit 113. This embodiment takes full advantage of the high currents generated by the generator 252 by charging the high charge current battery 103 in the mower with high charging currents by the high charging rate charging circuit 113 in the mower (relatively quickly) and/or by charging the alternate high charge current battery 103 in the charging station 254 with high charging currents by the high charging rate charging circuit 113 in the charging station 254 (relatively quickly) and/or by charging the low charge current battery 115 in the mower 100 with low charging currents by the low charging rate charging circuit 105 in the mower 100 (relatively slowly) and/or by charging the low charge current battery 115 in the charging station 254 with low charging currents by the low charging rate charging circuit 105 in the charging station 254 (relatively slowly). Additionally, the batteries 103 (either in the mower 100 or the charging station 254) can charge the batteries 115 (in the mower 100 or the charging station 254, respectively) with low charging currents by the low charging rate charging circuit 105 (in the mower 100 or the charging station 254, respectively) when power is not being generated by the generator 252, i.e., when the trailer 300 is not moving. In this manner, in one situation, the high charge current batteries 103 (in the mower 100 and the charging station 254) can be charged quickly with high charging currents when the trailer 300 is moving and the high currents are available (taking full advantage of the available high charging currents) and then the high charge current batteries 103 can charge the low charge current batteries 115 at the low charging currents when the high charging currents are not available.

A pivotable gate 260 may be connected to trailer 250. A flange 262 may be disposed on a platform 263 of the trailer 250. The flange 262 may have a curved slot 264. A handle 266 extends through slot 264 and threadingly engages the gate 260. With such construction, the user can rotate the gate 260 and lock it at a particular pivotal position by rotating handle 266.

Figure 7:
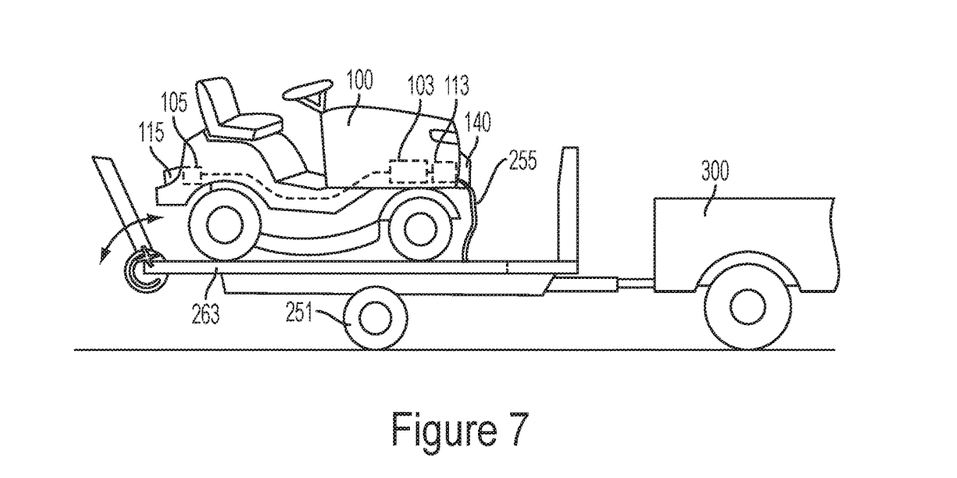
FIG. 7 illustrates a third exemplary embodiment of a mower and a charging system for charging batteries of the cordless system of FIGS. 1-2.
Figure 8:
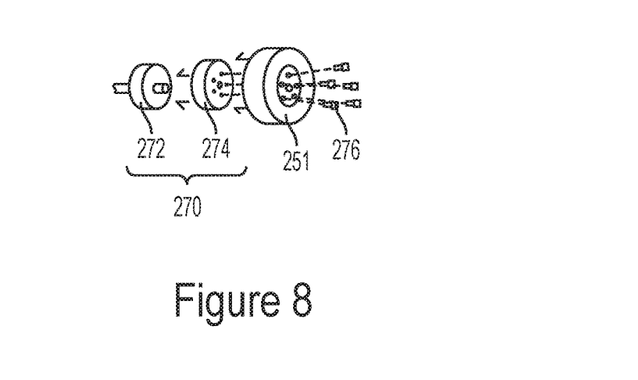
FIG. 8 is an exploded view of an exemplary hub motor used in a trailer of FIG. 7.

FIGS. 7-8 illustrate a third exemplary system for charging batteries and/or battery packs, where like numerals refer to like parts. Instead of having a separate generator/alternator 252, this embodiment includes a wheel hub motor 270 cooperating with the wheel 251. An exemplary hub motor can be found disclosed in US Publication No. 2014/0374178, filed Dec. 26, 2013, which is hereby fully incorporated by reference.

As shown in FIG. 8, the hub motor 270 has a stator 272 containing electric magnets and electronics for controlling the generated magnetic fields, and a rotor 274 slipped over the stator 272. The wheel 251 is bolted onto the rotor 274 via a set of bolts 276. Rather than using the hub motor 270 for driving the wheel 251, the hub motor 270 is used herein for power generation. Accordingly, as the trailer 250 is pulled by the vehicle 300, the wheel 251 rotates, causing the rotor 274 to rotate around the stator 272. Because the rotor 274 preferably has a set of permanent magnets, the magnetic field of such magnets induces a current in a set of coils surrounding the electric magnets in the stator 272.

This generated current can be conducted via the cable 255 to the high charging rate charging circuit 113 for charging the high charge current battery 103. Persons skilled in the art will recognize that, as described above, the high charge current battery 103 can be used to power the low charging rate charging circuit 105 to charge power tool battery packs 115.

Figure 9:
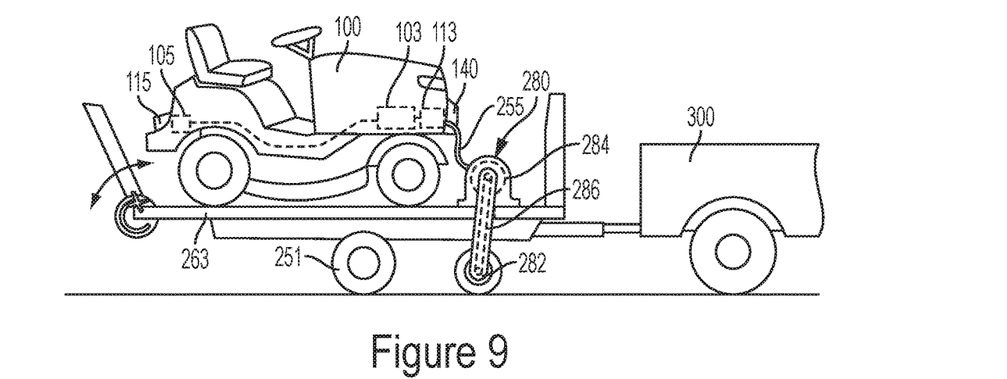
FIG. 9 illustrates a fourth exemplary embodiment of a mower and a charging system for charging batteries of the cordless system of FIGS. 1-2.

FIG. 9 illustrates another alternate exemplary trailer 250, where like numerals refer to like parts. Instead of having a generator/alternator 252 driven by the wheel 251, the trailer 250 preferably has a separate generator assembly 280, which has a wheel 282, a generator/alternator 284, and a transmission 286 connecting the generator wheel 282 and the generator/alternator 280 so that rotation of the generator wheel 282 causes the generator/alternator 280 to generate electrical power.

This generated current can be conducted via the cable 255 to the high charging rate charging circuit 113 for charging the high charge current battery 103. Persons skilled in the art will recognize that, as described above, the battery 103 can be used to power the low charging rate charging circuit 105 to charge the power tool battery packs 115 or the current can be provided directly to the charging circuit 105 from the generator/alternator 280 via the cable 255 and a switch 258.

Persons skilled in the art will recognize that the generator assembly 280 can be separate from the trailer 250 and that it preferably can be removed and installed on different trailers, as necessary or desired.

Figure 10:
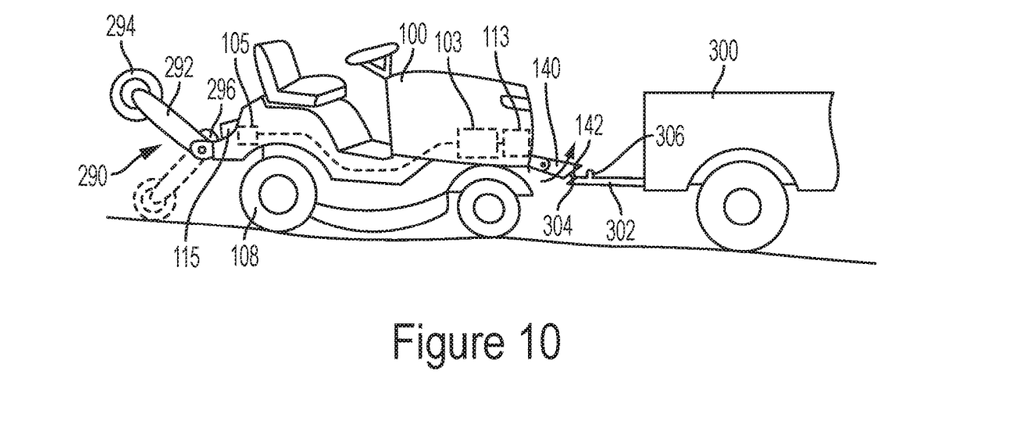
Figure 11:
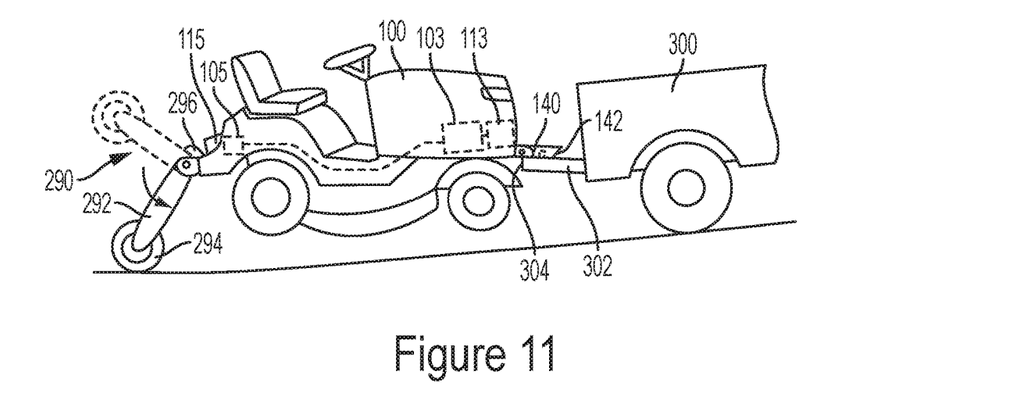

Referring to FIGS. 1 and 10-11, the mower 100 may have a pivotable hitch 140 for engaging a ball hitch 302 of the vehicle 300. The hitch 140 may be moved between a storage position (shown in broken lines in FIG. 1) and an extended position (shown in solid lines in FIG. 1) for engaging the ball hitch 302.

Persons skilled in the art will recognize that it is desirable to lock the hitch 140 in the extended position and/or the storage position. A pin (not shown) can be used to lock the hitch 140 in the desired position.

The hitch 140 may have a cam surface 142 which can contact and ride on a cam surface 304 of ball hitch 302. Accordingly, the user can drive the mower 100 towards the vehicle 300. The hitch 140 will contact and ride on the cam surface 304, lifting the hitch 140. As the mower 100 moves further towards the vehicle 300, the hitch 140 will move above and then fall on a ball post 306, thereby hitching the mower 100 to the vehicle 300. The battery 103 can be then be charged as described above while the vehicle 300 tows the mower 100, causing the wheels 108 to rotate.

Persons skilled in the art will recognize that some mowers 100 may have transmissions 107 that do not easily allow for rotation of the wheels 108 at high speed. Accordingly, the mower 100 may be provided with at least one generator wheel assembly 290. The generator wheel assembly 290 preferably has an arm 292 pivotally connected to the mower 100, and a wheel 294 preferably disposed at a distal end of the arm 292. The wheel 294 is operatively connected to a generator/alternator (not shown) in a similar manner as described above so that, when the wheel 294 rotates, the generator/alternator produces charging currents that can charge the battery 103 and/or the power tool battery packs 115.

Preferably the arm 292 is connected to a motor 296 which can rotate the arm 292 (and thus wheel 294) downwardly towards the ground. The motor 296 preferably has sufficient torque to lift up the mower 100, so that the wheels 108 are not contacting the ground. Instead the mower 100 is supported above the ground by the ball hitch 302 and the wheel(s) 294.

Alternatively, the arm 292 may be disposed in the lower position (not contacting the ground). The arm 292 may be fixedly attached to the mower 100 (thus obviating the need for the motor 296). Instead of driving the mower 100 into the ball hitch 302, the user would move the hitch 140 onto the ball hitch 302, then lift and push the mower 100. In this manner, the hitch 140 can engage the ball hitch 302, and the wheels 108 are lifted so that they are not contacting the ground. Instead the mower 100 is supported above the ground by the ball hitch 302 and the wheel(s) 294.

Persons skilled in the art may recognize other additions or alternatives to the means disclosed herein. However, all these additions and/or alterations are considered to be equivalents of the present invention.

The invention claimed is:

1. A lawn mower, comprising:
   at least two wheels for driving the mower;
   at least one blade for cutting grass;
   a generator for generating electricity;
   an electric motor electrically coupled to the generator for receiving the generated electricity, the electric motor coupled to the at least two wheels for driving the at least two wheels and/or the at least one blade for driving the at least one blade;
   a charging circuit electrically coupled to the generator for receiving the generated electricity; and
   at least one receptacle for receiving a removable battery pack, the receptacle including an electrical interface for electrically coupling the receptacle to the charging circuit to provide a charging current from the charging circuit to the receptacle and a mechanical interface for receiving and physically coupling the battery pack to the receptacle, wherein the electrical interface and the mechanical interface are substantially similar to an electrical interface and a mechanical interface of a cordless power tool such that the battery pack may electrically and mechanically couple to the mower electrical and mechanical interfaces to receive a charging current from the charging circuit and to the power tool electrical and mechanical interface to provide a discharging current to the power tool to operate the power tool.

2. The lawn mower, as recited in claim 1, further comprising a second charging circuit electrically coupled to the generator for receiving the generated electricity and a second battery electrically coupled to the second charging circuit wherein the second charging circuit provides a second charging current to the second battery and wherein the second charging current is greater than the first charging current.

3. The lawn mower, as recited in claim 2, further comprising a switch having a first input electrically coupled to the generator for receiving electricity from the generator and a second input electrically coupled to the second battery for receiving electricity from the second battery and an output selectively connectable to the first input and the second input for providing electricity to the first charging circuit from either the generator or the second battery.

4. The lawn mower, as recited in claim 1, wherein the generator is part of one of the at least two wheels.

5. A lawn mower comprising:
   at least two wheels for driving the mower;
   at least one blade for cutting grass;

a generator mechanically coupled to at least one of the at least two wheels, wherein the generator converts mechanical energy generated by the at least one of the at least two wheels into electrical energy as the at least two wheels rotate when the mower is being pulled on a road;

a first charging circuit electrically coupled (a) to the generator for receiving electricity and (b) to a first battery for providing a charging current to the first battery;

a second battery; and a second charging circuit electrically coupled (a) to the generator for receiving electricity and (b) to the second battery for providing a charging current to the second battery.

6. The lawn mower, as recited in claim 5, wherein the first charging circuit provides a first charging current and the second charging circuit provides a second charging current wherein the first charging current is greater than the second charging current.

7. The lawn mower, as recited in claim 5, further comprising a switch having a first input electrically coupled to the generator for receiving electricity from the generator and a second input electrically coupled to the first battery for receiving electricity from the first battery and an output selectively connectable to the first input and the second input for providing electricity to the second charging circuit from either the generator or the first battery.

8. The lawn mower, as recited in claim 5, wherein the second battery is incorporated into a removable battery pack including an electrical interface and a mechanical interface, the lawn mower further comprising a receptacle for receiving the removable battery pack, the receptacle including an electrical interface for electrically coupling the receptacle to the second charging circuit to provide a charging current from the second charging circuit to the receptacle and for electrically coupling the receptacle to the battery pack electrical interface to provide a charging current from the receptacle to the battery pack and a mechanical interface for receiving and physically coupling the battery pack mechanical interface to the receptacle mechanical interface, wherein the electrical interface and the mechanical interface are substantially similar to an electrical interface and a mechanical interface of a cordless power tool such that the battery pack may electrically and mechanically couple to the mower electrical and mechanical interfaces to receive a charging current from the second charging circuit and to the power tool electrical and mechanical interface to provide a discharging current to the power tool to operate the power tool.

9. The lawn mower, as recited in claim 5, wherein the generator is part of at least one of the at least two wheels.

10. A lawn mower, comprising:

at least two wheels for driving the mower;

at least one blade for cutting grass;

an electric motor electrically coupled to the at least two wheels for driving the at least two wheels and/or the at least one blade for driving the at least one blade when the motor is turning in a first direction and for generating electricity when the motor is turning in a second direction opposite the first direction;

a charging circuit electrically coupled to the electric motor for receiving the generated electricity;

at least one receptacle for receiving a removable battery pack, the receptacle including an electrical interface for electrically coupling the receptacle to the charging circuit to provide a charging current from the charging circuit to the receptacle and a mechanical interface for receiving and physically coupling the battery pack to the receptacle, wherein the electrical interface and the mechanical interface are substantially similar to an electrical interface and a mechanical interface of a cordless power tool such that the battery pack may electrically and mechanically couple to the mower electrical and mechanical interfaces to receive a charging current from the charging circuit and to the power tool electrical and mechanical interface to provide a discharging current to the power tool to operate the power tool.

* * * * *